Figure 1:
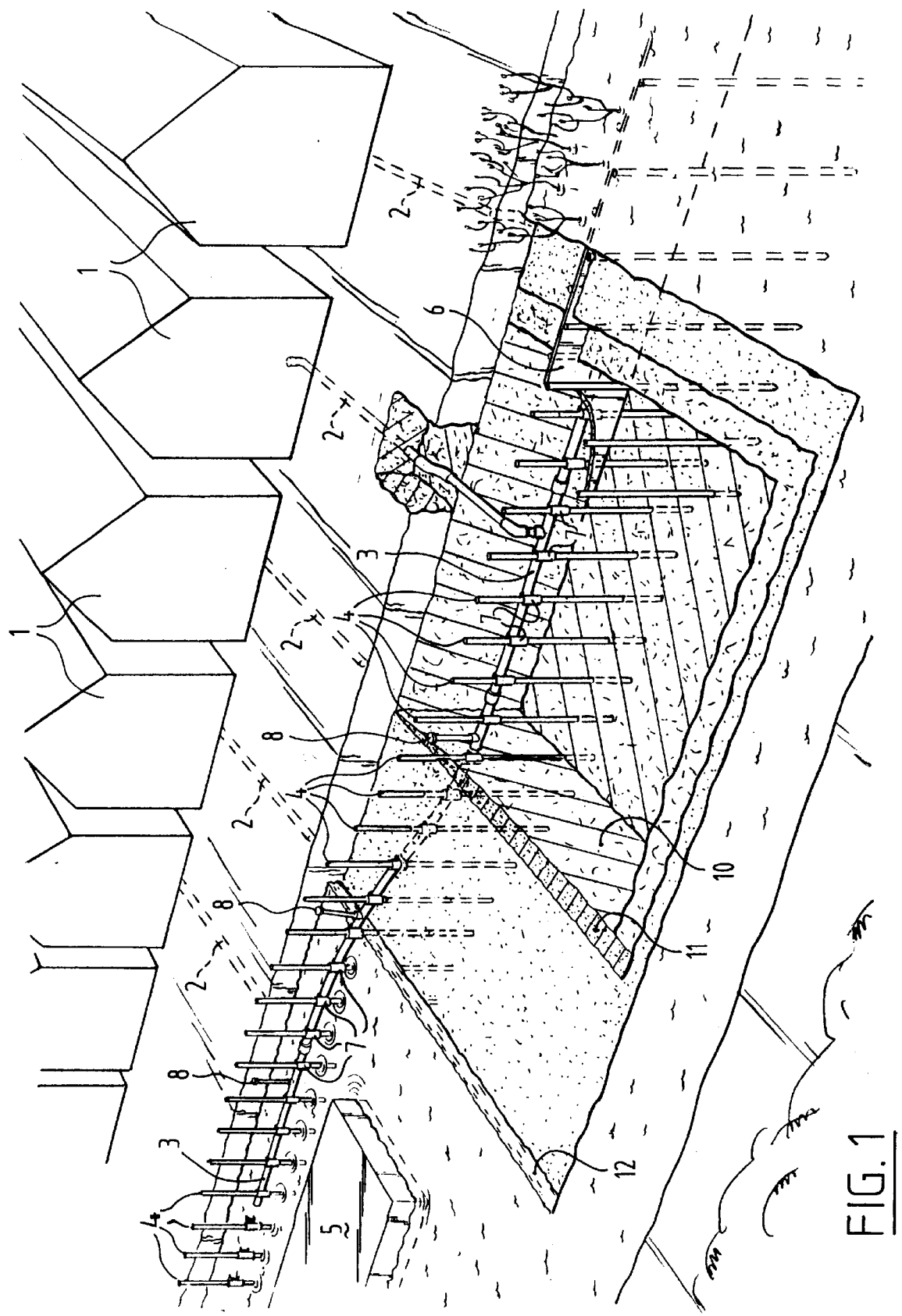

United States Patent [19]
De With et al.

[11] Patent Number: 5,927,900
[45] Date of Patent: Jul. 27, 1999

[54] METHOD FOR PLACING A SYSTEM OF DUCTS

[75] Inventors: Jan Hendrik De With, Heerenveen; André Van de Kraats, Huizen, both of Netherlands

[73] Assignee: Ingenieurs Bureau "Oranjewoud" B.V., Heerenveen, Netherlands

[21] Appl. No.: 08/796,253

[22] Filed: Feb. 6, 1997

[30] Foreign Application Priority Data

Feb. 6, 1996 [NL] Netherlands ............................ 1002255

[51] Int. Cl.⁶ ...................................................... F16L 1/00
[52] U.S. Cl. ........................ 405/154; 405/156; 405/271; 405/232
[58] Field of Search .................... 405/158, 171, 405/172, 232, 154, 271

[56] References Cited

U.S. PATENT DOCUMENTS

| | | | |
|---|---|---|---|
| 1,750,137 | 3/1930 | Smith | 405/228 |
| 3,256,695 | 6/1966 | Bodine | 405/182 |
| 3,479,830 | 11/1969 | Ostarly | 405/172 |
| 3,568,455 | 3/1971 | McLaughlin et al. | 405/154 |
| 3,772,892 | 11/1973 | Ogawa | 405/271 X |
| 4,112,692 | 9/1978 | Anderson et al. | 405/271 |
| 4,126,007 | 11/1978 | Mars | 405/271 |
| 4,268,189 | 5/1981 | Good | 405/172 X |
| 4,310,264 | 1/1982 | Brownlee | 405/172 |
| 4,329,083 | 5/1982 | Parkinson | 405/267 X |
| 4,436,452 | 3/1984 | Bodine | 405/228 X |
| 4,826,111 | 5/1989 | Ismert | 405/154 X |
| 5,007,768 | 4/1991 | Waller | 405/154 |
| 5,197,822 | 3/1993 | Parks | 405/158 X |
| 5,242,247 | 9/1993 | Murphy | 405/154 |
| 5,553,975 | 9/1996 | Elkins | 405/172 X |

FOREIGN PATENT DOCUMENTS

| | | | |
|---|---|---|---|
| 7705989 | 12/1977 | Netherlands | 405/172 |
| 8202199 | 12/1983 | Netherlands | 405/172 |
| 507741 | 4/1976 | U.S.S.R. | 405/172 |

Primary Examiner—Dennis L. Taylor
Attorney, Agent, or Firm—Mark Zovko

[57] ABSTRACT

The present invention relates to a method for arranging at least one duct in a ground. The method is distinguished by above ground assembly of the duct; bringing the ground into plastic state; and forcing the duct into the ground. The ground is subjected to vibration in order to effect the transition to the plastic state thereof. The method is also distinguished by placing piles and fixing the duct to the piles prior to bringing the ground into the plastic state; and by subsequently forcing the piles with the duct fixed thereto into the ground. The present invention further relates to a system of ducts in a ground which comprises at least one type of duct, wherein piles fixed to the ducts are arranged in the ground.

5 Claims, 2 Drawing Sheets

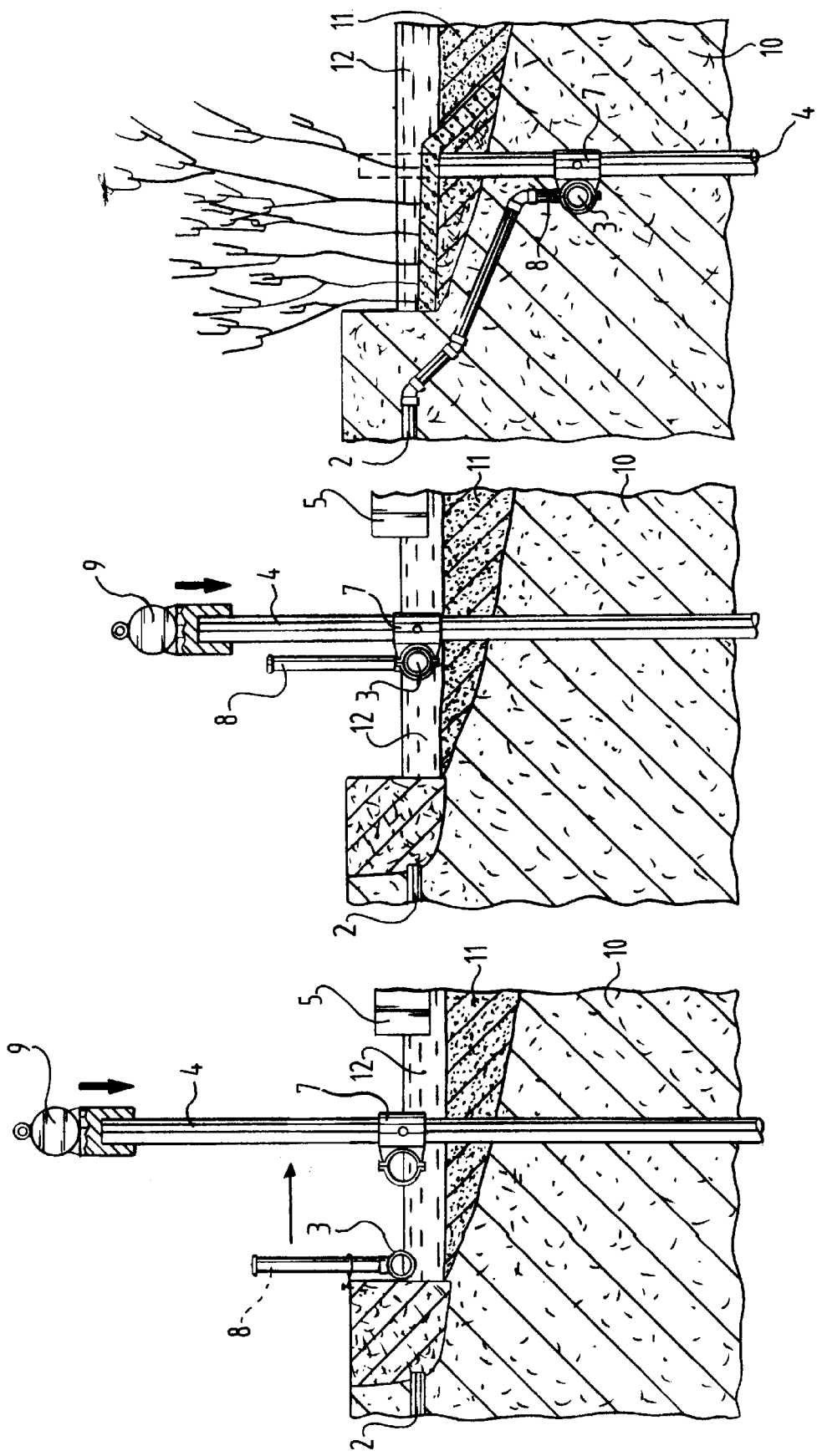

METHOD FOR PLACING A SYSTEM OF DUCTS

The present invention relates to a method for arranging at least one duct in a ground.

Prior to arranging of the duct in the ground a trench is normally excavated in which the duct is assembled so that it lies on the bottom of the trench, whereafter the trench is refilled with the earth excavated earlier in order to form the trench, or with another type of ground such as sand.

Such a method has the drawback that particularly the digging of a trench and refilling thereof after assembly of a duct is very time-consuming. Since the costs of laying a duct are proportional to the number of man and material hours allocated thereto, the costs are high.

Another drawback of such a method is that specific steps are required for application thereof to lay a duct in an underwater bed. In this case for instance elongate earth and water barriers corresponding with the form of the trench to be excavated must first be placed, whereafter the water between the earth and water barriers must be pumped away before a start can be made on excavation of the trench. Because it is necessary to place these earth and water barriers and to pump away the water therebetween, there is considerable time loss which is again directly associated with high costs. In addition, a large number of different machines are required, such as a machine for placing the earth and water barriers, a pump and an excavator, so that logistic problems may occur in the execution of such a method.

Another drawback of a method according to the prior art is that differential settlement and therefore stress in the duct can occur after refilling of the trench in which the duct is assembled.

Furthermore, digging of a trench in a ground which is normally under water is usually very difficult since it is very marshy. In addition, a boat must often be present to hold the earth excavated from the ground so that, after assembly of the duct in the trench, it can again be discharged over the duct.

The present invention has for its object to obviate at least one or several of the above stated and other drawbacks and provides for this purpose a new method which is distinguished by: above ground assembly of the duct; bringing the ground into plastic state; and forcing the duct into the ground.

A method according to the present invention which can be applied at least in a thixotropic ground renders unnecessary the excavation of a trench in order to place a duct in a per se dry ground. With a method according to the present invention it is further no longer necessary to place earth and water barriers in order to arrange ducts in an underwater bed.

A method as preferred embodiment of the present invention is distinguished by subjecting the ground to a vibration in order to effect the transition to the plastic state thereof.

A second method as preferred embodiment of the present invention is distinguished by filling the duct prior to forcing thereof into the ground. Filling can take place with liquid such as water.

Thus is advantageously realized that a vulnerable hollow duct of for instance plastic is made sufficiently rigid to enable forcing of the duct into the ground without damage thereto. Filling a duct with liquid, and particularly water, brings about an optimum transmission along the length of the duct of shock waves caused during the vibration.

A third method as preferred embodiment of the present invention is distinguished by simultaneously forcing into the ground at least one additional duct, wherein the ducts are at least mutually connected. In advantageous manner therefore two or more identical or different ducts can be arranged in the ground simultaneously.

A fourth method as preferred embodiment of the present invention is distinguished by placing piles and fixing the duct to the piles prior to bringing the ground into the plastic state; and by subsequently forcing the piles with the duct fixed thereto into the ground.

The piles form a foundation for the duct both during the transition of the ground from the plastic state thereof to the solid state and thereafter. It is noted here that arrangement of such a foundation is perhaps possible in the known method but is certainly very costly.

The piles further form connecting points for performing the operation whereby the ground is brought into the plastic state thereof.

The invention therefore further comprises a system of ducts which, in a preferred embodiment thereof, is distinguished in that a row of piles fixed to the ducts is arranged in the ground.

The present invention will be further elucidated with reference to the figure description hereinbelow of an embodiment thereof. In the drawing:

FIG. 1 shows a system of ducts under construction using a method according to the present invention; and FIGS. 2a–2c show side views of different stages of the construction of a system of ducts as shown in FIG. 1 using a method according to the present invention.

In the figures the same components are referred to with the same reference numerals.

Shown in FIG. 1 is a system of ducts under construction using an embodiment of a method according to the present invention, wherein the system of ducts comprises the sewage system of houses 1. The houses 1 are connected via drain conduits 2 to the sewer 3 after sewer 3 has been arranged in the ground.

In the embodiment shown here the ground comprises a solid bed 10 having thereon a sludge layer 11 over which flows a water 12. The sewer 3 must be placed in the solid bed 10 subject to the required coverage.

To this end the sewer 3 is fastened by means of couplings 7 to piles 4. Assembly of sewer 3 and/or fixing thereof to piles 4 preferably at the water level by means of couplings 7 can take place from the waterside or can alternatively take place from a pontoon 5.

The sewer 3 comprises connecting pipes 8 at the locations where connection to drain conduits 2 has to be effected. The sewer 3 is filled with water via these connecting pipes 8, wherein the free outer end of sewer 3 is closed and whereafter connecting pipes 8 can be closed.

The row of piles 4 is then vibrated systematically into the solid bed 10, wherein the vibrations are transmitted particularly via sewer 3 onto the solid bed 10. It is noted here that the solid bed 10 comprises a thixotropic soil type so that the solid bed 10 is brought into the plastic state thereof by means of the above mentioned vibrations. The systematic approach in the performing of a vibrating operation on piles 4 is important to avoid damaging stress in the material of the sewer 3. It is otherwise noted that prior to performing of the vibrating operation the sewer 3 can be filled with water in order to bring about a required rigidity of the sewer 3 and because shock waves resulting from these vibrating operations are well transmitted along the length of the sewer 3 by the water in sewer 3.

The row of piles 4, and therefore the sewer 3 fixed to piles 4, is vibrated to the desired depth in the solid bed 10, whereafter connection of drain conduit 2 and connecting pipe 8 is effected. For this purpose some excavation has to be carried out only at the position of this connection.

It is noted herein that in this manner it is very simple to lay a free fall pipe by arranging sewer 3 progressively deeper in the solid bed 10 in the fall direction thereof.

By fixing partitions 6 to the piles 4 after arranging of the sewer 3 it is possible in simple manner to create a new waterside. With use of this method the piles 4 can further serve as foundation for separate building structures such as jetties, buildings etc.

It is further noted here that with the above described method other ducts can be arranged simultaneously or separately in the ground such as water pipes, gas pipes, telephone cables and/or electricity cables.

FIG. 2a–2c show in cross-sectional view clearly distinguishable stages in the arrangement of sewer 3 in the solid bed 10.

Prior to the stage shown in FIG. 2a, the pile 4 has already been vibrated to a predetermined depth in the solid bed 10 using a vibrating head 9 forming part of an apparatus otherwise not shown. Diverse types of equipment are available in the art to serve as such an apparatus and this will not be further described here.

In the stage shown in FIG. 2a the sewer 3 with connecting pipe 8 is connected to pile 4 by means of the coupling 7. This operation can take place from pontoon 5, although in the case shown here arrangement of the coupling 7 takes place from the waterside.

In the stage shown in FIG. 2b the pile 4 with the sewer 3 coupled thereto is then vibrated gradually into the solid bed to the desired depth. This operation of vibrating in the piles 4 with the sewer 3 coupled thereto takes place systematically, for instance in the manner shown in FIG. 1.

In the stage shown in FIG. 2c the connecting pipe 8 is subsequently brought to the desired length thereof, whereafter connecting pipe 8 can be placed in connection with drain conduit 2. Some excavation may have to be carried out for this purpose, except in the case where the partitions 6 shown in FIG. 1 form a new waterside and the water between the old and the new waterside is pumped away. The space between the old and the new waterside will then later be filled with earth so that a connection between drain conduit 2 and connecting pipe 8 located above the level of sludge layer 11 will be buried by filling up this space. In any case, no trench need be excavated along the full length of the sewer 3.

We claim:

1. Method for arranging at least one duct in the ground, the ground having thixotropic properties, comprising the steps of assembling the duct in place above the ground; attaching piles to the duct in a substantially upright position relative to the ground; and vibrating the piles in a substantially longitudinal direction with respect to the piles and the duct therewith to produce a plastic state in the ground thereby driving the piles with the duct fixed thereto into the ground.

2. Method as claimed in claim 1, characterized by filling said duct prior to driving said duct into the ground.

3. Method as claimed in claim 1, characterized by simultaneously driving into the ground at least one additional duct, wherein the ducts are at least mutually connected.

4. Method as claimed in claim 1, characterized by driving the piles to a determined depth in the ground prior to fixing the duct to the piles.

5. Method as claimed in 1, characterized by fixing more than one type of duct to the piles.

* * * * *